(12) United States Patent
Dewachter

(10) Patent No.: US 8,399,543 B2
(45) Date of Patent: Mar. 19, 2013

(54) ADDITIVISING CARBON BLACK TO POLYMER POWDER

(75) Inventor: Daan Dewachter, Meehelen (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 204 days.

(21) Appl. No.: 12/741,448

(22) PCT Filed: Nov. 4, 2008

(86) PCT No.: PCT/EP2008/064934
§ 371 (c)(1),
(2), (4) Date: Sep. 15, 2010

(87) PCT Pub. No.: WO2009/059967
PCT Pub. Date: May 14, 2009

(65) Prior Publication Data
US 2011/0015331 A1 Jan. 20, 2011

(30) Foreign Application Priority Data

Nov. 6, 2007 (EP) .................................... 07120045

(51) Int. Cl.
*C08J 3/20* (2006.01)
(52) U.S. Cl. .......................... 523/351; 524/495; 524/496
(58) Field of Classification Search .................. 523/351; 524/495, 496
See application file for complete search history.

(56) References Cited

U.S. PATENT DOCUMENTS

| 6,565,784 | B1 | 5/2003 | Esseghir |
| 2006/0199893 | A1 | 9/2006 | Schrempf |
| 2007/0063374 | A1* | 3/2007 | Barakat .......................... 264/140 |

FOREIGN PATENT DOCUMENTS

| EP | 0841144 | 5/1998 |
| GB | 1219946 | 1/1971 |

* cited by examiner

*Primary Examiner* — Edward Cain

(57) ABSTRACT

The present invention concerns an improved method for introducing free carbon black additive into a polymer powder or fluff, and in particular into polyethylene powder.

6 Claims, 3 Drawing Sheets

ADDITIVISING CARBON BLACK TO POLYMER POWDER

CROSS-REFERENCE TO RELATED APPLICATIONS

This application claims the benefit of PCT/EP2008/064934, filed Nov. 4, 2008, which claims priority from EP 07120045.5, filed Nov. 6, 2007.

The present invention concerns an improved method for introducing carbon black pigment into a polymer powder or fluff, and in particular into polyethylene powder. The method is advantageous, since it is capable of introducing the additive in a homogeneous manner throughout the polymer powder without the need for using a master batch. The invention also covers the device that was used to implement said method.

For many years it has been known to introduce pigment and additives to polymers, such as polyethylene and polypropylene, in order to improve the properties of the polymers. Additives may impart many different advantageous effects to the polymers. Typical additives include pigment and additives for protection against UV radiation, anti-corrosion additives, anti-oxidant additives or pigments. Generally the simplest method for introducing these additives into the polymers has been to extrude the polymer in the presence of the additives. The extrusion process causes melting of the polymer, and as the molten or softened polymer is extruded through a die, the additives become evenly mixed through the polymer volume, leading to generally homogeneous distribution of the additives throughout the extruded pelletised product.

Due to the nature of the manufacturing process, polymers are typically obtained in powder form from a reactor. It is this powder that is introduced into an extruder with the required pigment and additives. In the present application the additive is a pigment: it is carbon black that simultaneously colours the resin and protects it against ultra-violet radiations.

The extruders available on the market are used either for mono-colour extrusion, or for multi-colour extrusion.

Many applications, such as for example pipe or fuel tank applications, require the use of black pigments, typically carbon black that is used both to colour the resin and to protect it from ultra-violet radiations. Carbon black is typically available as a black powder or in pelletised form and is very difficult to use as such because it contaminates the environment and soils the machinery thus requiring serious cleaning before it can be used for another application or another colour. Carbon black is therefore generally introduced into the resin in a master batch, thus requiring an extra costly step of compounding before use.

Here is thus a need to find an efficient method for introducing carbon black into polymer powder.

It is an aim of the present invention to provide a method and apparatus for introducing carbon black into a polymer powder or fluff, and in particular into polyethylene or polypropylene powder.

It is another aim of the present invention to use carbon black in powder form.

It is also an aim of the present invention to reduce the amount of energy necessary to produce black polymer pellets.

It is a further aim of the present invention to reduce the amount of cleaning necessary after adding carbon black to a polymer resin.

Any one of these aims is, at least partially, fulfilled by the present invention.

Accordingly, the present invention provides a method for introducing carbon black into a polyolefin powder, which method comprises the following steps:

a) feeding the polymer powder and optional additives through the feeding inlet (2) of main extruder (1);
b) feeding a composition of polymer powder and free carbon black through the feeding inlet (6) of a small side extruder (5) wherein the composition comprises from 10 to 60 wt % of carbon black;
c) feeding the molten or partially molten polymer/carbon black composition exiting extruder (5) into extruder (1) through side feed (7);
d) extruding the resulting polymer additivated with the amount of carbon black necessary for the desired application.

With the present equipment, the feeding system of the main extruder is not contaminated by the free carbon black. In the present description, free carbon black is carbon black in powder form.

In conventional systems, in order to avoid contamination of the extruder feed system, carbon black is introduced into the polymer in a master batch containing about 40 wt % of carbon black compounded with the polymer. This method requires that the master batch be prepared separately and be reheated when fed in the extruder. The present invention offers an important energetic advantage as the mixture free carbon black/polymer is prepared directly at the side of the main extruder and is introduced therein in the molten state.

The polymer is preferably polyethylene or polypropylene, more preferably it is polyethylene.

LIST OF FIGURES

FIG. 1 represents the apparatus used to add free carbon black to the polymer powder. It comprises a main extruder 1 and a side extruder 5 connected to the main extruder through side feed 7.

Figure 1:
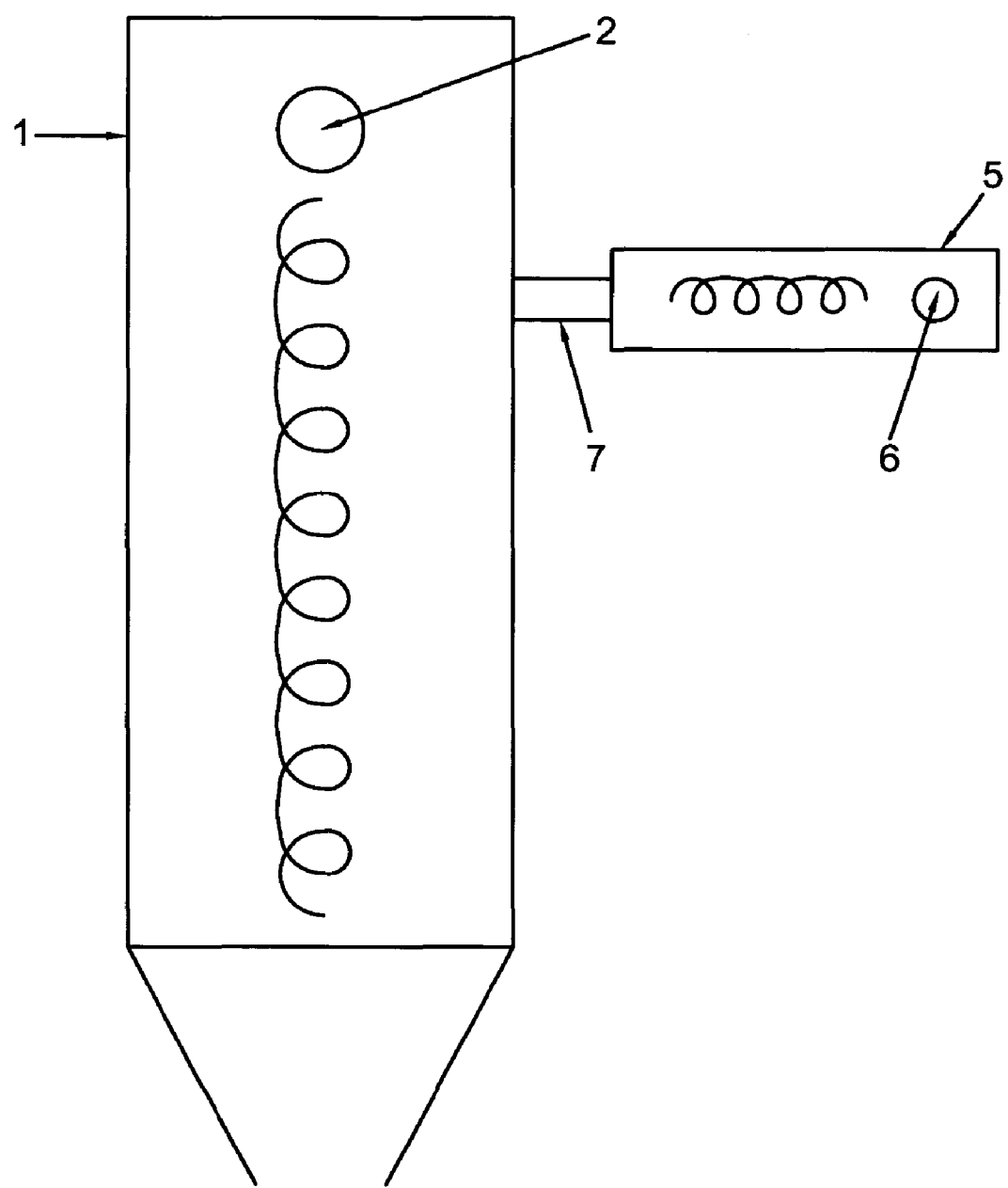

In the context of the present invention, powder means any form of the polymer that is in a particulate form and has not been extruded. The particles of polymer may be of any size normally produced in an industrial manufacturing process. Typically the particles are produced by sedimentation into a settling leg of a polymerisation reactor. These particles are often termed fluff. Generally such fluff particles range in size and are 1600 μm or less in diameter. Preferably they are 1500 μm or less in diameter, and more preferably from 10 μm to 1000 μm in diameter. Most preferably the particles range from 100-1000 μm in diameter. The mean particle diameter for monomodal polymer is preferably 300 μm or greater, whilst for bimodal polymer it is preferably 125 μm or greater.

The characteristic properties of the polyethylene are not especially limited, but generally it is a high density polyethylene. Preferably the polyethylene has a density of from 920 to 970 kgm$^{-3}$ in the case of a monomodal polyethylene, and from 920 to 965 kgm$^{-3}$ in the case of a bimodal polyethylene. The density is measured following the method of standard test ASTM D 1505 at a temperature of 23° C. Preferably the polyethylene has a bulk density of from 380 to 520 kgm$^{-3}$ in the case of a monomodal polyethylene, and from 280 to 470 kgm$^{-3}$ in the case of a bimodal polyethylene. The bulk density is measured following the method of standard test ASTM D 1895. The melt index of the polyethylene is not especially limited, but preferably it ranges from 0.03 to 60.0 dg/min. The melt flow index is measure following the method of standard test ASTM D 1238 at a temperature of 190° C. and under a load of 2.16 kg.

To put the present method in context, a typical process for producing the polymer powder will first be described. Such a process generally employs a turbulent flow reactor such as a continuous pipe reactor in the form of a loop. However, other types of reactors such as stirred reactors may be used.

Polymerisation is carried out in a loop reactor in a circulating turbulent flow. A so-called loop reactor is well known and is described in the Encyclopaedia of Chemical Technology, $3^{rd}$ edition, vol. 16 page 390. This can produce LLDPE (linear low density polyethylene) and HDPE (high density polyethylene) resins in the same type of equipment. A loop reactor may be connected in parallel or in series to one or more further reactors, such as another loop reactor. A loop reactor that is connected in series or in parallel to another loop reactor may be referred to as a "double loop" reactor.

In a double loop reactor, the process is a continuous process. A monomer, preferably ethylene, polymerises in a liquid diluent, in the presence of an optional comonomer, hydrogen, catalyst, and activating agent. The slurry is maintained in circulation by an axial pump in a reactor consisting essentially of vertical jacketed pipe sections connected by trough elbows. The polymerisation heat is extracted by a water cooling jacket. The reactor line includes two double loop reactors that can be used in parallel or in series. The approximate volume of the reactors may be about 100 $m^3$. Monomodal grades are produced with the parallel or series configuration and bimodal grades are produced with the series configuration.

The polymer product is taken out of the reactor with some diluent through settling legs and discontinuous discharge valves. A small fraction of the total circulating flow is withdrawn. It is moved to a polymer degassing section in which the solid content is increased.

While being depressurised, the slurry is transferred through heated flash lines to a flash tank. In the flash tank, the product and diluent are separated. The degassing is completed in a purge column. A conveyor drying unit may be employed before the purge column in some instances The powder product transported under nitrogen to fluff silos may remain as fluff, or may be extruded into pellets along with some specific additives. A pellet treatment unit comprising silos and hot and cool air flows allows the removal of residual components from the pellets. The pellets then are directed to homogenisation silos before final storage.

The gas exiting the flash tank and the purge column is treated in a distillation section. This allows the separate recovery of diluent, monomer and comonomer.

This embodiment of the double loop reactor process is usable with chromium type, Ziegler-Natta type or metallocene type catalysts. Each catalyst type may have a specific injection system.

The present invention relates to the additivation of free carbon black, or carbon black in powder form, to the polymer at the end of the exemplary production process.

Carbon black is a necessary additive for several applications such as pressure pipes for potable water and gas, irrigation pipes or utility pipes, for fuel tanks and for geomembranes.

Figure 2:
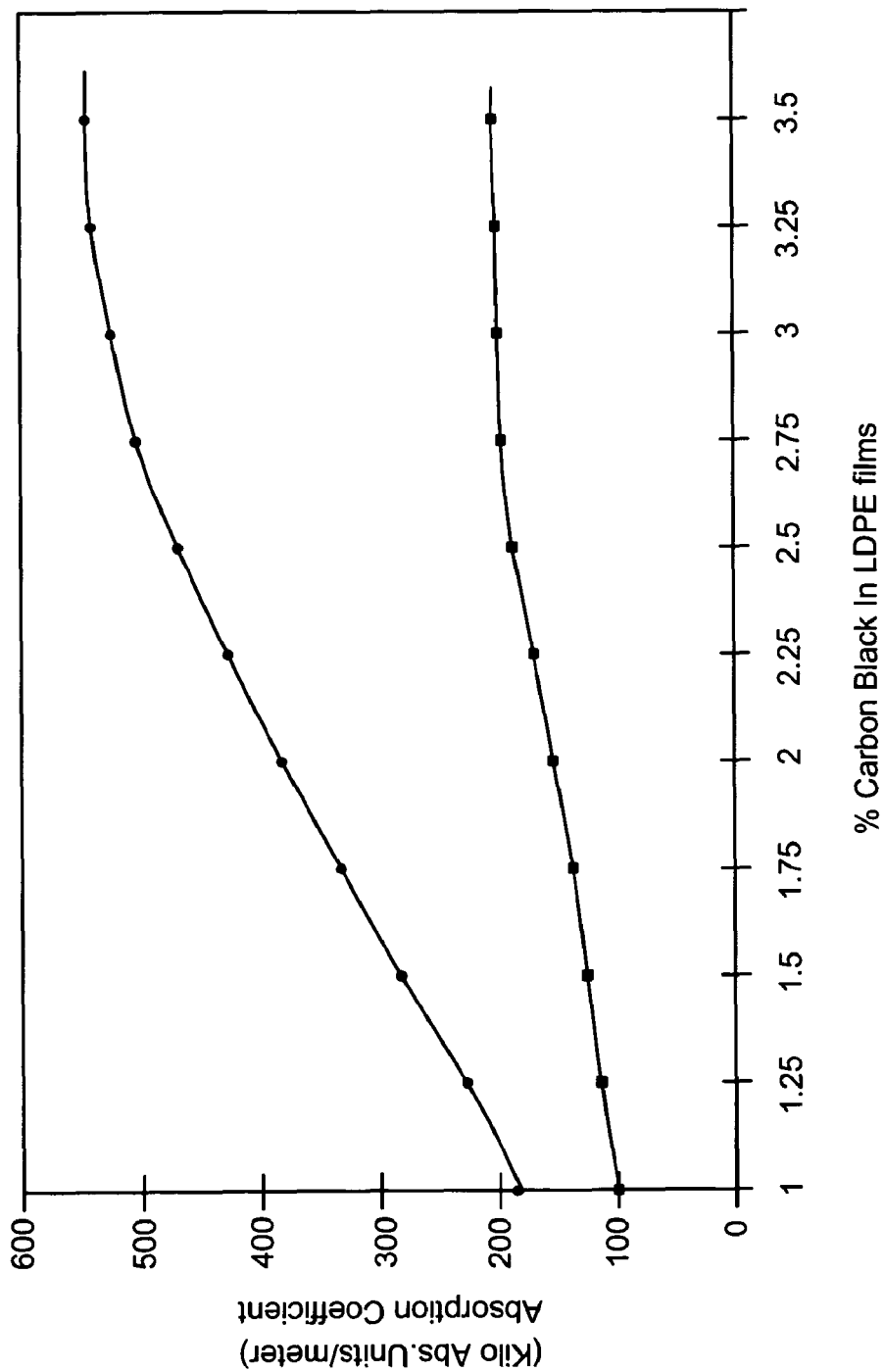
FIG. 2 represents the absorption coefficient, expressed in kilo abs.unit/m, as a function of percentage of carbon black, for a low density polyethylene (LDPE) film, and for carbon black particle size respectively of <25 nm (losanges) and 60 nm (squares).
Figure 3:
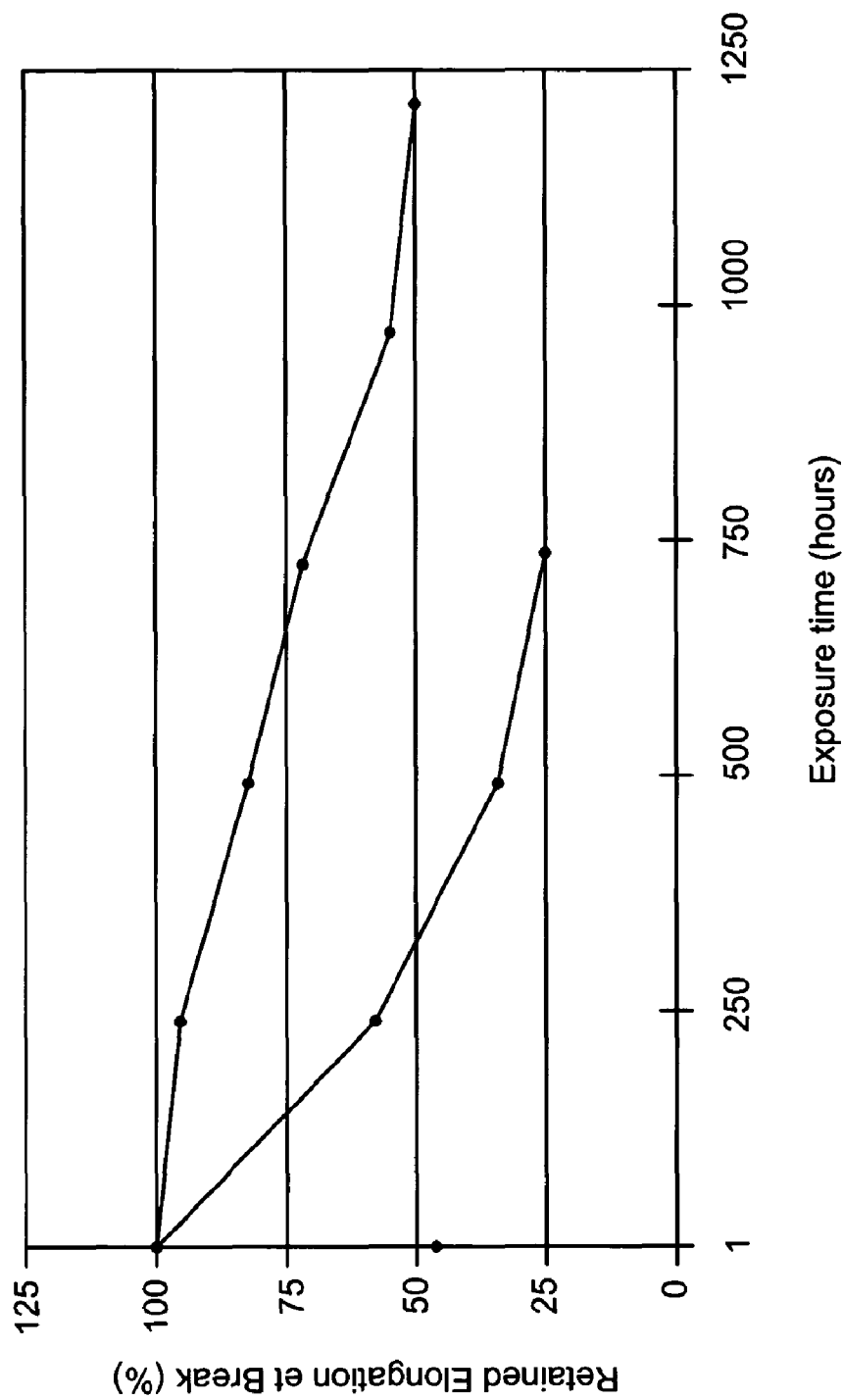
FIG. 3 represents the retained elongation at break expressed in % as a function of exposure time expressed in hours, for a 25 μm LDPE film containing 2.5 wt % of carbon black, and for carbon black particle size respectively of <25 nm (black line) and 60 nm (grey line).

The carbon black used in the present invention preferably satisfies one or more of the following characteristics.
  Small particle size. It is one of the most efficient light absorbers and its efficiency as a UV absorber increases with decreasing particle size at equivalent carbon black loading. This behaviour is displayed in FIG. 2 representing the absorption coefficient as a function of percentage of carbon black for different particle sizes. Particle sizes range from 15 to 60 nm, preferably at most 25 nm. Furthermore, the retained elongation at break also decreases also decreases with increasing particle size. This behaviour is displayed in FIG. 3 representing the retained elongation at break as a function of exposure time for different particle sizes.
  Good dispersion in the polymer and de-agglomeration.
  Good chemical cleanliness, with negligible remaining toluene, sulphur and ash.
  Small water absorption. Indeed, water absorption can create processing difficulties, surface defects or internal cavities in the finished part.

For some applications such as for example geomembranes, it can be desirable to use carbon black under the form of soft pellets.

In order to impart adequate UV protection, the amount of carbon black in the final product is preferably of from 0.5 to 5 wt %, based on the total weight of the composition, depending upon the final application. The amount necessary for fuel tank is at the low end of the range whereas that necessary for pipes is preferably of from 2 to 3 wt %.

The present invention also covers the apparatus used to add free carbon black to polymer powder. Said apparatus, represented in FIG. 1, comprises a main extruder 1 wherein the polymer and optional additives are fed through feed 2 and a small side extruder 5, connected to the main extruder through side feed 7, wherein the mixture of polymer and free carbon black is fed through feed 6.

The invention claimed is:

1. A method for introducing carbon black into a polyolefin powder comprising:
  feeding a polymer powder and optional additives through a feeding inlet of a main extruder, wherein the polymer powder is in a particulate form that has not been extruded;
  feeding a composition of polymer powder and free carbon black through a feeding inlet of a small side extruder, wherein the composition comprises from 10 to 60 wt. % of carbon black;
  feeding molten or partially molten polymer/carbon black composition exiting the small side extruder into the main extruder through a side feed; and
  extruding the resulting polymer additivated with the amount of carbon black necessary for the desired application.

2. The method of claim 1, wherein the polymer is polypropylene or polyethylene.

3. The method of claim 2, wherein the polymer is polyethylene.

4. The method of claim 1, wherein the amount of carbon black in the additivated polymer is from 0.5 to 5 wt. % based on the weight of the additivated polymer.

5. The method of claim 4, wherein a size of the carbon black particles is from 15 to 60 nm.

6. The method of claim 4, wherein a size of the carbon black particles is at most 25 nm.

* * * * *